(No Model.)
J. W. SAVENE.
METALLIC WHEEL.
No. 377,579. Patented Feb. 7, 1888.
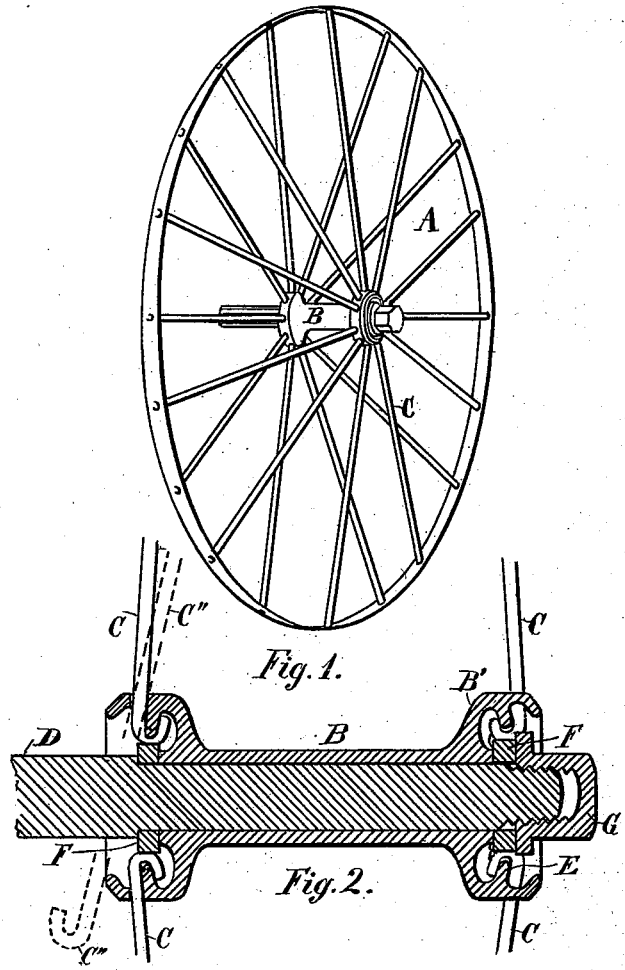
Fig. 1.
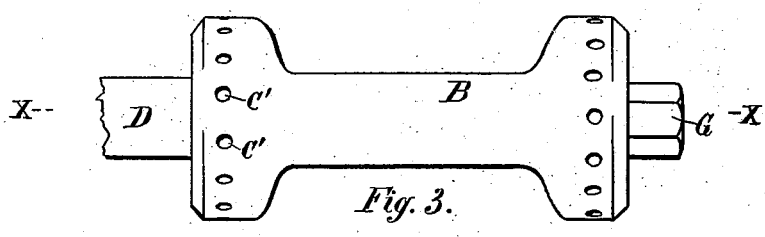
Fig. 2.
Fig. 3.
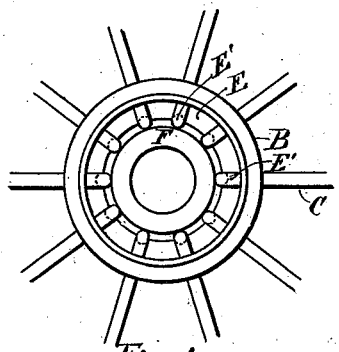
Fig. 4.
Witnesses.
J. E. Raymer
C. J. Webster
Inventor:
John W. Savene,
By William Webster
Atty

UNITED STATES PATENT OFFICE.

JOHN WILLIAM SAVENE, OF TOLEDO, OHIO.

METALLIC WHEEL.

SPECIFICATION forming part of Letters Patent No. 377,579, dated February 7, 1888.

Application filed September 8, 1887. Serial No. 249,091. (No model.)

*To all whom it may concern:*

Be it known that I, JOHN WILLIAM SAVENE, a citizen of the United States, residing at Toledo, in the county of Lucas and State of Ohio, have invented certain new and useful Improvements in Metal Wheels; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to a metal wheel, and has for its object to provide a wheel of great rigidity as well as simplicity in construction with the parts removable and interchangeable. Heretofore in this class of wheels, which are especially adaptable for children's carriages, velocipedes, bicycles, &c., it has been found difficult to construct a wheel with the necessary strength that shall be sufficiently light and portable. It is also necessary from the character of the work to which these wheels are put to provide an easy and convenient means of replacing any of the parts that may be broken or bent by accident or careless use. I attain these objects by the construction illustrated in the drawings, in which—

Figure 1 is a perspective view of a complete wheel constructed in accordance with my invention. Fig. 2 is a longitudinal cross-section on lines X X, Fig. 3, with some of the spokes inserted to show their arrangement within the hub, also in dotted lines the manner of removing or inserting the spokes. Fig. 3 is an elevation of the hub, showing the perforations through which the spokes pass. Fig. 4 is an end view showing the arrangement of the interior of the hub with the spokes in place.

Like letters of reference indicate like parts through the views.

A designates the wheel; B, the hub, which has a central bearing for the axle D and is formed with circumferential enlargements B' upon each end, which extend a distance beyond the central bearing and are of a greater diameter internally. Each end B' of the hub has a depending flange, E, intermediate the length of its enlargement, and perforations C' registering with the outer face of the flange, the flange being cut away semi-cylindrically at points corresponding with the perforations, as shown at E', for a purpose hereinafter stated.

C represents the spokes bent at their inner ends to conform to the contour of flange E, and attached to the rim of the wheel in any preferred manner.

F are washers placed one upon each end of the bearing of the axle, the inner washer being held against a shoulder of the axle formed by reducing that portion of the axle that forms the journal to a less diameter than that of the axle. The outer washer is held in place by the usual nut, G, upon the end of the axle.

In putting the parts together to form a wheel the outer end of the spoke is passed through the perforation C', the bent end of the spoke being turned outwardly, as shown in dotted lines, Fig. 2, until the bent portion enters the cylindrical enlargement of the end D', when it is turned inwardly to partially embrace the flange E. The spoke seating in the semi-cylindrical cut-out portion E' of the flange, collars F are inserted, their peripheries bearing lightly against the bends of the spokes, thereby preventing displacement of the same. Journal D of the axle is now placed within the hub, the shoulder bearing against the inner collar. Nut G is run upon the outer end of the axle and bears against the outer collar, and the parts are held firmly in place, the collar F revolving freely upon the journal.

When it is desired to remove a spoke for the purpose of inserting a new one in case of breakage or for any other reason, nut G is unscrewed, the wheel removed from the axle, collar F also removed, and the spoke can be readily taken out by disengaging the bent portion from flange E, giving the spoke a half-turn and withdrawing the same, as shown in dotted lines, Fig. 2.

It will be seen that by the construction described great strength is insured with simplicity of construction and interchangeability of parts that obviates the usual expense of repairs in case of breakage.

Having described my invention, what I claim, and desire to secure by Letters Patent, is—

1. In a metal wheel, a hub having enlarged ends extending beyond the central bearing and of greater diameter internally, a concentric depending flange within the enlarged end, perforations through the hub coincident with the side of the flange, and spokes having bent ends partially embracing the flange and held in place by bearings concentric to the axle, as and for the purpose set forth.

2. In a hub for metal wheels, flanges concentric to the bearing and integral with the hub, and perforations through the ends of the hub coincident with the flanges, said perforated portions being formed integral with the hub, as and for the purpose set forth.

In testimony that I claim the foregoing as my own I hereby affix my signature in presence of two witnesses.

JOHN WILLIAM SAVENE.

Witnesses:
 EMERY R. HIETT,
 WILLIAM WEBSTER.